May 2, 1944.  G. E. KRICKER  2,347,914
METHOD AND APPARATUS FOR WELDING
Filed Sept. 12, 1941
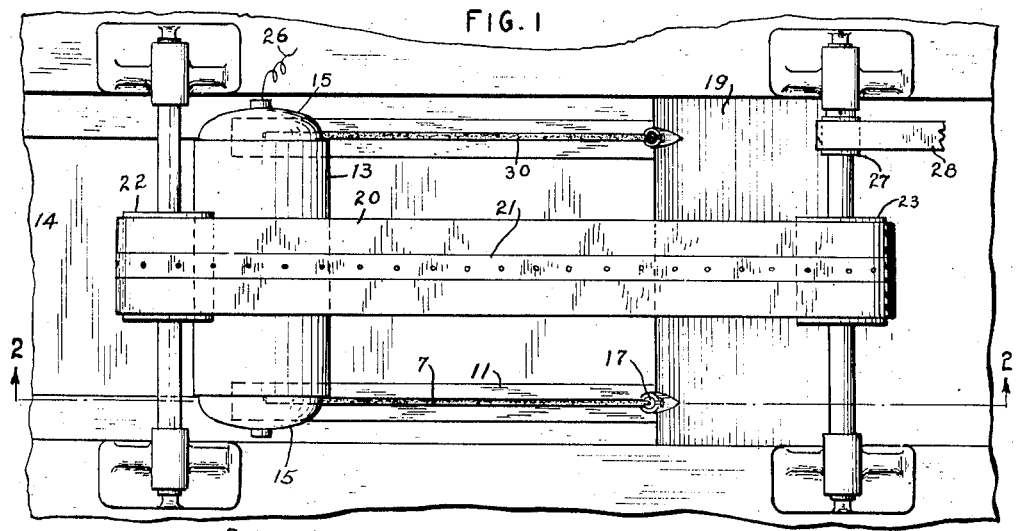
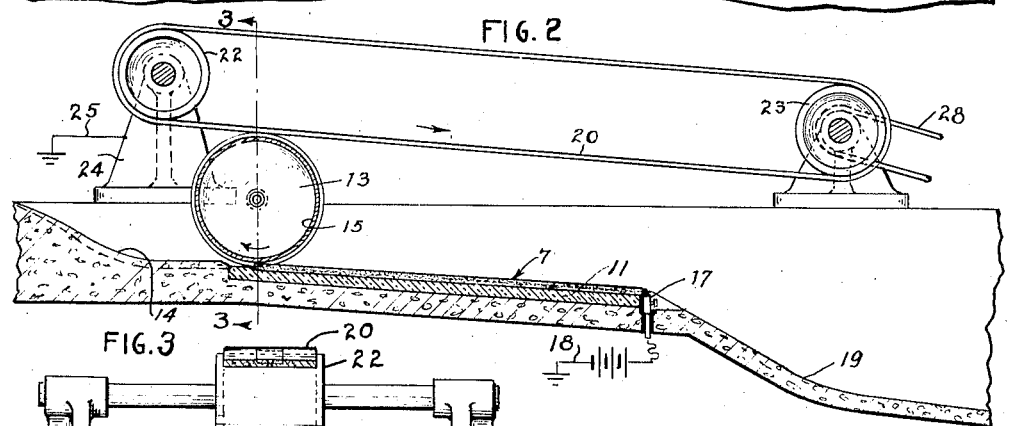
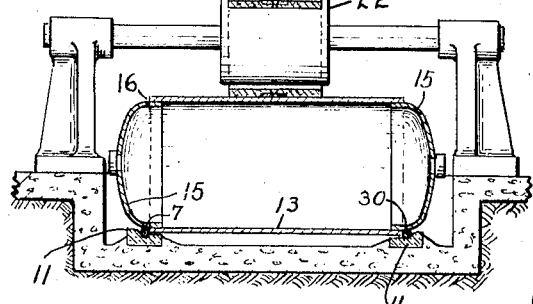
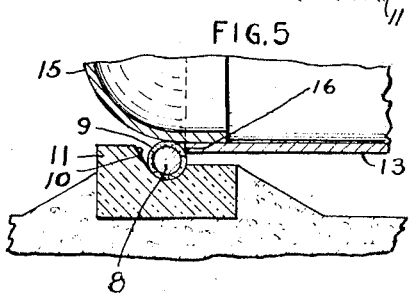
INVENTOR.
GEORGE E. KRICKER.
BY Louis W. Schmidt Patented May 2, 1944

2,347,914

UNITED STATES PATENT OFFICE 2,347,914

METHOD AND APPARATUS FOR WELDING

George E. Kricker, Lakewood, Ohio, assignor to The Midland Steel Products Company, Cleveland, Ohio, a corporation of Ohio Application September 12, 1941, Serial No. 410,568

15 Claims. (Cl. 219—6)

This invention relates to new and useful methods of and apparatus for electrode welding and an important object of the invention is to move the work to be welded relative to one or more stationary coated electrodes or weld rods at the same speed the electrode is consumed in order to lay one or more circumferential welds on a circular or irregular shaped workpiece.

Another object of the invention is to provide means to weld the work while in transit from one station to another and to reduce handling.

Another object of the invention is to utilize the weight of the work in retaining the weld rod in position thereon to be fused into the seam, and to shield the weld zone whereby oxidation of the welded seam is prevented.

Other objects and advantages of the invention will become apparent during the course of the following description.

In the accompanying drawing forming a part of the application and wherein like numerals are employed to designate like parts throughout the several views.

Fig. 1 is a top plan of the apparatus employed,

Fig. 2 is a longitudinal section of the same taken on the line 2—2 of Fig. 1,

Fig. 3 is a transverse section taken on the line 3—3 of Fig. 2,

Fig. 4 is an enlarged fragmentary section illustrating the starting point of the welding, Fig. 5 is an enlarged fragmentary section taken transversely through Fig. 4.

This invention makes use of a self operating coated electrode or weldrod which will automatically form a weld by the mere act of including it in an electrical circuit and laying it upon the work so that it will be progressively melted into the seam in "powder fuse" fashion. The invention provides method and apparatus for making use of this type of welding to lay circular and irregularly shaped seams by using the electrode or weldrod as a track upon which the article to be welded is moved and in effect picks up the weld material much in the manner of a cylinder rolling upon a string with one end thereof attached thereto to wind it upon the cylinder as it rolls lengthwise of such strand.

Referring more particularly to the drawing, the numeral 7 designates a straight length of electrode or coated weldrod, which consists of a metallic core 8 with a coating of combustible non-oxidizing insulating material of uniform thickness and density throughout the length of the electrode. This coating 9 has a thickness of ⅐ to 1/12 the diameter of the core 8 and is preferably hard and tough and is composed of extruded and baked ingredients such as weldrod known as Fleetweld No. 5 manufactured by the Lincoln Electric Company of Cleveland, Ohio, of a character to sustain the imposed weight of the article to be welded, without danger of cracking the coating and developing short circuits. Being perfectly straight throughout its length, the coated weldrod is laid horizontal or at a very slight incline to the horizontal in a longitudinally extending groove 10 of an insulating track 11 which is highly resistant to heat. The groove 10 is of less depth than the diameter of the coated weldrod so that the latter projects above the track when laid in the groove to support the article to be welded in spaced relation to the track. The starting end of the weldrod is slightly bared as at 12, so that when an article such as the cylinder 13 is rolled on to the bared end from an inclined supply station 14, an electrical contact will be established which will be drawn out into an arc as the cylinder rolls up on the insulating material to space it from the core rod at a distance equal to the thickness of the coating 9. As the cylinder 13 has both ends closed by dome-shaped pressure heads 15, having annular flanged portions which have press fits inside of the ends of the cylinder to provide lapped joints 16, the welds are laid in such joints to securely fasten the heads to the cylinder in air tight relation. Since the uniform thickness of coating 9 maintains a constant space between the core 8 and the cylinder 13, a uniform length of arc is maintained throughout the length of the weldrod, which progressively melts throughout its length, so that by rolling the cylinder along the weldrod at a surface speed equal to the movement or speed of travel of the arc along the weld rod, a weld will be laid in the lapped joint entirely around the periphery of the cylinder by the time it reaches the other end of the weldrod. This end of the weldrod 7 is electrically connected as at 17 to a source of electric current 18. This electric connection can either be the anode or cathode of the source, depending upon whether it is more desirable to make this connection the positive or negative pole. With direct current, the weldrod is usually connected with the positive pole while with alternating current or that of reversible polarity, the electrode may represent either pole. In metal electrode welding the positive pole is usually connected to the work in order that it will be more quickly heated than the electrode, to properly receive the fused core material. The support 19 for the coated electrode beyond the electrical connection 17 is inclined downwardly so that when the weld is complete, the article will automatically roll away from the apparatus.

In order to roll the cylinder so that its peripheral or surface speed is exactly the same as the rate of travel or progress of the arc lengthwise of the weldrod, an endless belt 20 is arranged lengthwise of the track 11 with its lower run spaced a distance above and parallel with the track 11 just slightly less than the diameter of the cylinder 13 so as to engage the top of the same for rolling or retarding the rolling of the cylinder. This belt is provided with an endless metallic strip 21 which is always engaged with the periphery of the cylinder in order that the welding circuit may be completed through the cylinder, the endless conductor strip 21 and then through the pair of pulleys 22 and 23 to be grounded through the pulley standards 24 to a ground connection 25. If preferred, instead of providing the conductor strip 21 on the belt, the cylinder 13 can be grounded directly through its axis to a flexible coiled conductor 26 to the ground which conductor is of sufficient length to reach throughout the length of movement of the cylinder during welding. The shaft of pulley 23 is provided with a sheave 27 geared by means of the belt 28 to a suitable source of variable speed in order that the speed of the belt 20 may be regulated whereby the peripheral speed of the cylinder 13 may be regulated to have exactly the same speed as the rate of weldrod consumption or the rate of travel of the arc lengthwise of the rod.

The track 11 may be slightly inclined downwardly to cause the cylinder 13 to roll down the same by gravity, in which case the belt 20 will serve in the capacity of a speed retarding device to enable the cylinder to roll down the track at exactly the same speed throughout the length thereof. In cases where the belt 20 is positively driven either in conjunction with an inclined or perfectly horizontal track 11, the rotation of the pulleys 22 and 23 is counter-clockwise thereby rolling the cylinder 13 in a clockwise direction to traverse the length of the coated weldrod.

While the description thus far has dealt with welding one end of the cylinder at a time, it may be possible to simultaneously weld both ends by providing an additional coated weldrod 30 and connecting the same to a separate source of electrical current, or it may be possible to connect the same with the same source of current to which the first electrode is connected.

With this method of welding it will be apparent that no attention to the welding apparatus is required other than turning the machine on and off, and in this connection, it is desirable to connect the drive for the belt 20 and the welding circuit with the same switch mechanism so that they both start and stop simultaneously. The operator simply places a cylinder to be welded in the guiding and receiving station 14 which guides the same to roll until it engages the arcing end of an electrode 7 placed in the track 11 at which point the belt 20 will stop the cylinder at the proper place where the welded seam is to be started. As the welding circuit and belt 28 are started simultaneously, an arc will be generated as soon as the cylinder 13 rolls up on the insulation 9 of the electrode to space the joint to be welded and the core 8 of the electrode. As the electrode is progressively fused in "powder fuse" fashion, the cylinder will be moved therealong at a corresponding speed whereby the fusible electrode material will be deposited in the molten joint between the cylinder and its head 15 entirely around its circumference until the entire electrode has been consumed and the seam has been completed.

Since the coated weldrod is laid in the track groove with the cylinder disposed on top of the weldrod, it will be appreciated that the rod is held in place by the weight of the cylinder and that a confined welding space is provided which will be filled with non-oxidizing gases coming from the combustion of the flux-slag coating material 9 to exclude atmospheric air. Consequently, a very high grade ductile, non-porous weld will be laid in the joint 16 circumferentially between the head 15 and the end of the cylinder 13.

While a cylinder has been designated as the work operated upon in this present example of the invention, it will of course be understood that the method and apparatus is applicable to any circular work and in fact irregularly shaped polygons or any shape designed to have its periphery or any portion thereof welded. It will also be understood that the terms employed in the claims are for the purpose of illustration and not limitation other than that imposed by the state of the art.

I claim:

1. The method of welding consisting of laying a straight self-operating coated weld rod upon a downwardly inclined support, and supporting a cylinder upon said weld rod and circumferentially rolling said cylinder by gravity lengthwise on said weld rod along a line of welding while the weld rod is arcing with the cylinder to lay a continuous weld circumferentially on said cylinder.

2. The method of welding consisting of laying a straight self operating coated weldrod with a self arcing end upon a support, and supporting a cylinder upon said weldrod and circumferentially rolling said cylinder upon the self arcing end to strike an arc between the end of the rod and cylinder and continuing lengthwise on said weldrod along a line of welding at a speed equal to the rate of travel of the arc to lay a circumferential weld.

3. The method of welding consisting of laying a self operating coated weldrod in a groove of a support, said groove being of less depth than the diameter of said weldrod, and supporting a cylinder upon said weldrod and maintaining an arc between the weldrod and cylinder while rolling said cylinder lengthwise upon said weldrod to support said cylinder in spaced relation above said support.

4. The method of welding consisting of laying a self operating coated weldrod upon a support, and circumferentially rolling a cylinder with a circumferential shoulder lengthwise upon said rod to cause an arc to be maintained between the end of the rod and cylinder, and guiding said cylinder by its shoulder engaging and rolling lengthwise on said coated weldrod.

5. The method of welding consisting of laying a straight self operating flux-slag coated weldrod upon a support, and rolling a cylinder circumferentially on said weldrod lengthwise thereof while the end of the weldrod is arcing with the cylinder to lay a continuous weld circumferentially on said cylinder.

6. Apparatus for laying a circumferential weld around a cylinder comprising a support, a straight self operating weldrod laid on said support to support said cylinder tangentially thereof, and means adapted to engage the periphery of said cylinder to control the rolling surface speed of the same upon said weldrod.

7. Apparatus for laying a circumferential weld around a cylinder comprising a support, a self operating weldrod laid on said support to support said cylinder tangentially thereof, an endless belt having one of its runs parallel to said support and adapted to engage the periphery of said cylinder to control the rolling surface speed of the same upon said weldrod.

8. The method of welding circumferentially, consisting of laying a self operating flux coated weld rod on a support and immobilizing the same thereon with one end connected to a source of electrical current, supporting an electrically grounded cylinder upon said weld rod and rolling the cylinder circumferentially thereon and lengthwise thereof while the end of the weld rod is progressively arcing with the cylinder to lay a continuous weld circumferentially on said cylinder.

9. The method of welding circumferentially, consisting of laying a straight self operating flux coated weld rod on a support and immobilizing the same in a downwardly inclined position, supporting a cylinder upon the elevated end of said weld rod and causing the cylinder to roll circumferentially by gravity thereon and lengthwise thereof while the weld rod is progressively arcing with the cylinder to lay a continuous weld circumferentially on said cylinder.

10. Apparatus for laying a circumferential weld around a cylinder comprising a support, a straight self operating and coated weld rod laid on said support with its starting end bared and projecting above the support, said cylinder adapted to be rolled circumferentially upon said support toward the weld rod and upon said bared end of the weld rod tangentially thereof to be elevated the proper arcing distance to cause an arc to be automatically struck between the rod and cylinder and to be maintained by the thickness of the coating on the weld rod as the cylinder rolls lengthwise of the same to lay a continuous weld circumferentially on said cylinder.

11. Apparatus for laying a circumferential weld around a cylinder comprising a substantially horizontal support, a straight self operating coated weld rod laid substantially horizontally upon said support, said cylinder adapted to be welded circumferentially and having its weight supported upon said weld rod with the latter tangent thereto, and means for rolling said cylinder lengthwise of said weld rod at a peripheral speed commensurate with the speed of travel of the arc along the rod whereby the arc is continuously maintained at the point of substantial tangency of the rod and cylinder.

12. Apparatus for laying a circumferential weld around a cylinder comprising a substantially horizontal support, a straight self operating coated weld rod laid substantially horizontally upon said support, said cylinder adapted to be welded circumferentially and having its weight supported upon said weld rod with the latter tangent thereto, and an endless belt parallel with the weld rod and having its lower run adapted to engage the periphery of the cylinder for controlling the rolling speed of the cylinder to conform with the speed of travel of the arc along the weld rod.

13. Apparatus for laying a circumferential weld around a cylinder comprising a substantially horizontal support, a straight self operating coated weld rod laid substantially horizontally upon said support, said cylinder adapted to be welded circumferentially and having its weight supported upon said weld rod with the latter tangent thereto, said weld rod being connected to one side of a source of welding current, an endless belt parallel with the weld rod having its lower run adapted to engage the periphery of the cylinder for controlling the rolling speed of the cylinder to conform with the speed of travel of the arc along the weld rod, and said belt having an endless electric conductor connected to the other side of the source of welding current and adapted to contact with the cylinder to complete an electrical circuit.

14. Apparatus for laying a circumferential weld around a metallic cylinder comprising a support, a self operating weld rod connected to a source of electrical energy and laid upon said support to support the cylinder tangentially thereof, a pair of spaced electrically grounded metallic pulleys, and an endless metallic element trained around said pulleys with one of its runs substantially parallel to said support to engage the periphery of said cylinder for controlling its rolling speed upon said electrode and to electrically ground said cylinder.

15. The method of welding consisting of arranging a self operating weldrod with its arcing end in arcing relation to the work while connected with a welding circuit, connecting a ground conductor of constant length to the work to travel therewith, and supporting the work upon the weldrod while moving the work in a direction lengthwise of said weldrod.

GEORGE E. KRICKER.